(12) United States Patent
Lin

(10) Patent No.: US 6,439,421 B1
(45) Date of Patent: Aug. 27, 2002

(54) DETACHABLE DEVICE HANDLE MOUNTING STRUCTURE

(76) Inventor: George Lin, PO Box 82-144, Taipei (TW)

( * ) Notice: Subject to any disclaimer, the term of this patent is extended or adjusted under 35 U.S.C. 154(b) by 0 days.

(21) Appl. No.: 09/995,699

(22) Filed: Nov. 29, 2001

(51) Int. Cl.[7] .............................................. B65D 25/28
(52) U.S. Cl. ........................................ 220/759; 16/425
(58) Field of Search ................................ 220/759, 770; 16/425; 294/34, 31.1

(56) References Cited

U.S. PATENT DOCUMENTS

| | | | | |
|---|---|---|---|---|
| 2,370,860 A | * | 3/1945 | Hanke | ........................ 220/759 |
| 4,965,907 A | * | 10/1990 | Baumgarten | ................. 220/759 |
| 5,704,092 A | * | 1/1998 | Wicollet et al. | ............. 220/759 |
| 6,250,493 B1 | * | 6/2001 | Kwan | ........................... 220/759 |
| 6,260,733 B1 | * | 7/2001 | Eimerman | ................... 220/759 |

* cited by examiner

*Primary Examiner*—J Moy
(74) *Attorney, Agent, or Firm*—Leong C. Lei

(57) ABSTRACT

A detachable device handle mounting structure is constructed to include a mounting frame fixedly fastened to an apparatus the mounting frame having a front plug plate, a handle detachably coupled to the mounting frame, a button supported on a spring in a stepped vertical through hole of the handle, and a retainer element fixedly fastened to the button to lock the handle and the mounting frame. The retainer element is lowered and disengaged from the mounting frame when the user pressed the button, enabling the handle to be disconnected from the mounting frame.

3 Claims, 5 Drawing Sheets

DETACHABLE DEVICE HANDLE MOUNTING STRUCTURE

BACKGROUND OF THE INVENTION

1. Field of the Invention

The present invention relates to a device handle and, more particularly to a detachable device handle mounting structure, which comprises a mounting frame fixedly fastened to a kitchen utensil (pan. pot, baking oven, steamer basket, etc.), a handle detachably coupled to the mounting frame, and lock means adapted to lock/unlock the handle.

2. Description of the Related Art

The handle of a regular handled kitchen utensil is fixedly fastened to the peripheral wall of the kitchen utensil by rivets or screw nails. Because the handle is not detachable the user cannot chance the design of the handle. Because of the presence of the handles, handled kitchen utensils cannot be arranged in a stack or put in an automatic dish cleaner for washing.

SUMMARY OF THE INVENTION

The present invention has been accomplished under the circumstances in view. It is the main object of the present invention to provide a detachable device handle mounting structure, which enables a handle to be detachably fastened to a kitchen utensil. It is another object of the present invention to provide a detachable device handle mounting structure, which enables the user to selectively attach different designs of handles to a kitchen utensil. To achieve these and other objects of the present invention, the detachable device handle mounting structure comprises a mounting frame fixedly fastened to a kitchen utensil, the mounting frame having a split front plug plate. a handle detachably coupled to the mounting frame, the handle having a horizontal plughole, which receives the split front plug plate of the mounting frame, and a stepped vertical through hole across the horizontal plughole, a button supported on a spring in the stepped vertical through hole of the handle, and a retainer element fixedly fastened to the button to lock the handle and the mounting frame. When pressing the button, the retainer element is lowered with the button and disengaged from the front plug plate of the mounting frame, enabling the handle to be disconnected from the mounting frame. By means of the aforesaid arrangement, handles of different designs can be selectively fastened to the mounting frame.

DETAILED DESCRIPTION OF THE PREFERRED EMBODIMENT

Figure 1:
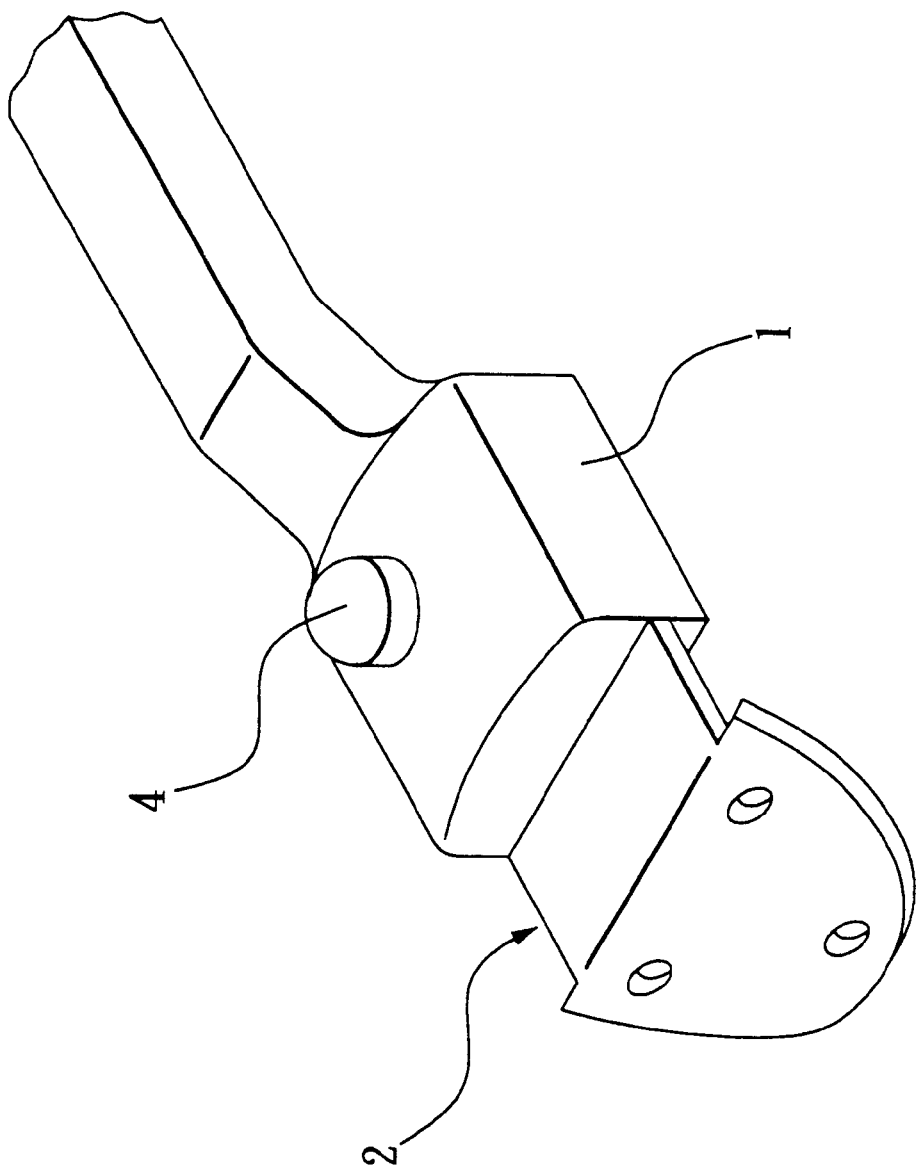
FIG. 1 is an elevational view of the detachable device handle mounting structure according to the present invention.

Referring to FIG. 1, a detachable device handle mounting structure in accordance with the present invention is shown comprising a mounting frame 2, a handle 1 coupled to the mounting frame 2, and a control button 4 provided at the handle 1 for operation by to unlock the handle 1 for enabling the handle 1 to be disconnected from the mounting frame 2.

Figure 2:
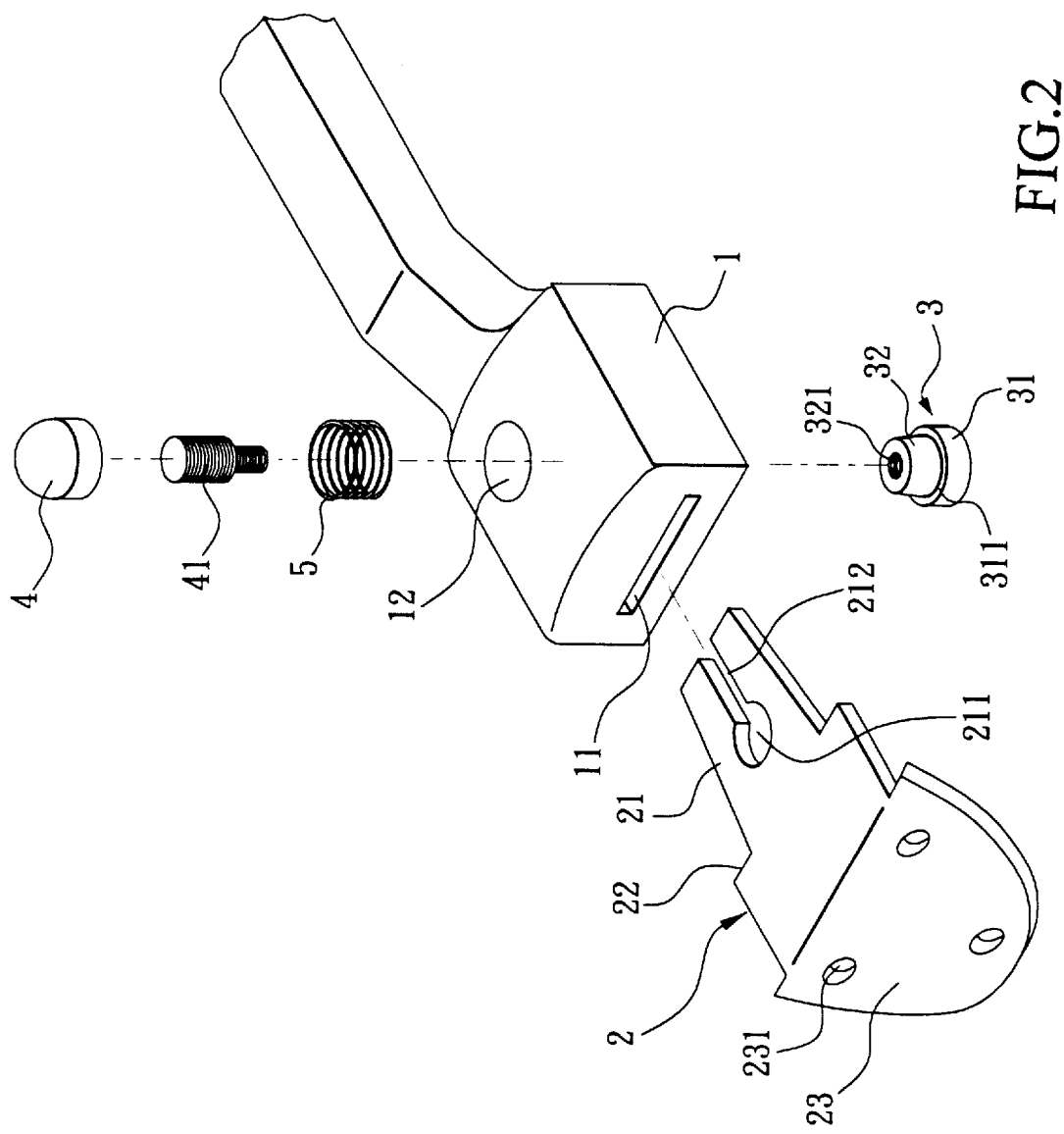
FIG. 2 is an exploded view of the detachable device handle mounting structure according to the present invention.
Figure 3:
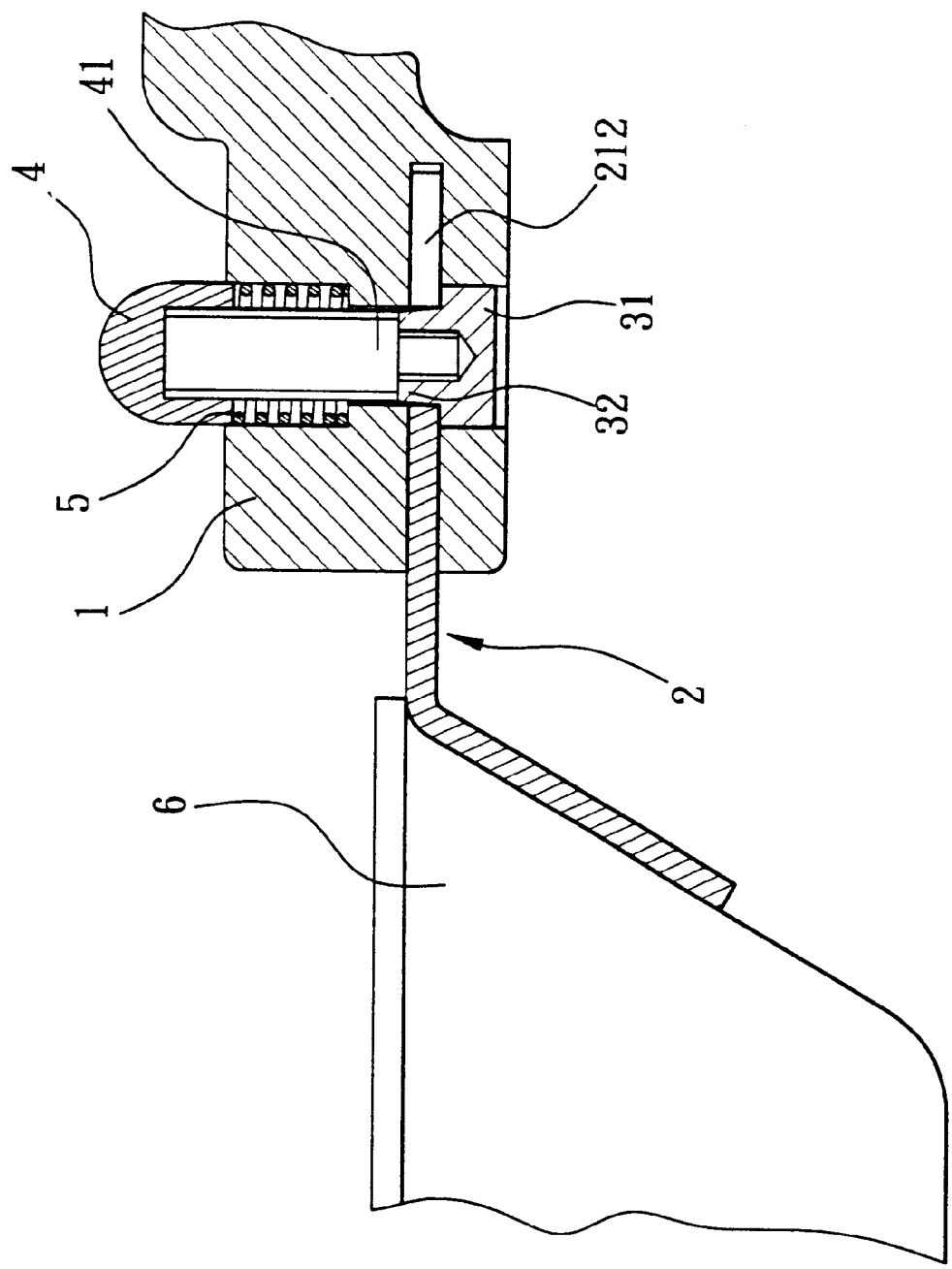
FIG. 3 is a sectional view of the present invention, showing the mounting frame fixedly fastened to a pan, the handle coupled to the front plug plate of the mounting frame and locked.

Referring to FIGS. 2 and 3, the handle 1 comprises a flat plughole 11 axially extended through the front sidewall thereof, and a stepped through hole 12 vertically extended through the top and bottom sidewalls thereof across the flat plughole 11. The flat plughole 11 has a width gradually backwardly reduced from the front side of the handle 1 toward the rear side. The mounting frame 2 comprises a rear mounting base 23, the rear mounting base 23 having a plurality of mounting holes 231 respectively fixedly fastened to the peripheral wall of an apparatus, for example, a pan 6, by a respective rivet (not shown), a front plug plate 21 plugged into the flat plughole It of the handle 1, and a shoulder 22 connected between the front plug plate 21 and the rear mounting base 23 and stopped against the front sidewall of the handle 1 outside the flat plughole 11. The front plug plate 21 has a circular center hole 211 and a longitudinal split 212 forwardly extended from the circular center hole to the front side thereof. The width of the front plug plate 21 fits the width of the flat plughole 11. When inserting the front plug plate 21 into the flat plughole 11 of the handle 1, the front plug plate 21 is bilaterally forced inwards to close the longitudinal split 212.

Referring to FIGS. 2 and 3 again, a locking mechanism is installed in the stepped through hole 12 to lock the handle 1. The locking mechanism comprises the aforesaid button 4, a compression spring 5, and a retainer element 3. The retainer element 3 is a stepped short rod member comprising a bottom big diameter section 31, a top small diameter section 32 axially extended from the bottom big, diameter section 31, a step 311 connected between the bottom big diameter section 31 and the top small diameter section 32, and a top screw hole 321 formed in the top small diameter section 32. The top small diameter section 32 is preferably tapered, i.e., the outer diameter of the top small diameter section 32 gradually reduced in direction from the step 311 toward the topmost edge thereof. The compression spring 5 is mounted in the stepped through hole 12 of the handle 1 at the top and supported on a step inside the stepped through hole 12. The button 4 is fixedly mounted with a screw rod 41. After installation of the compression spring 5 in the stepped through hole 12 of the handle 1 and insertion of the front plug plate 21 of the mounting frame 2 in the flat plug hole 11 of the handle 1, the screw rod 41 is inserted through the compression spring 5 in the stepped through hole 12 of the handle 1 and the circular center hole 211 of the front plug plate 21 of the mounting frame 2, keeping the button 4 supported on the compression spring 5, and then the retainer element 3 is inserted into the stepped through hole 12 of the handle 1 from the bottom side and threaded onto the screw rod 41, keeping the top small diameter section 32 engaged in the circular center hole 211 of the front plug plate 21 of the mounting frame 2 and the step 311 stopped at the bottom sidewall of the front plug plate 21 of the mounting frame 2. When installed, the compression spring 5 imparts an upward pressure to the button 4, and therefore the retainer element 3 is pulled upwards by the button 4 and the screw rod 41, keeping the step 311 positively stopped at the bottom sidewall of the front plug plate 21 of the mounting frame 2.

Figure 4:
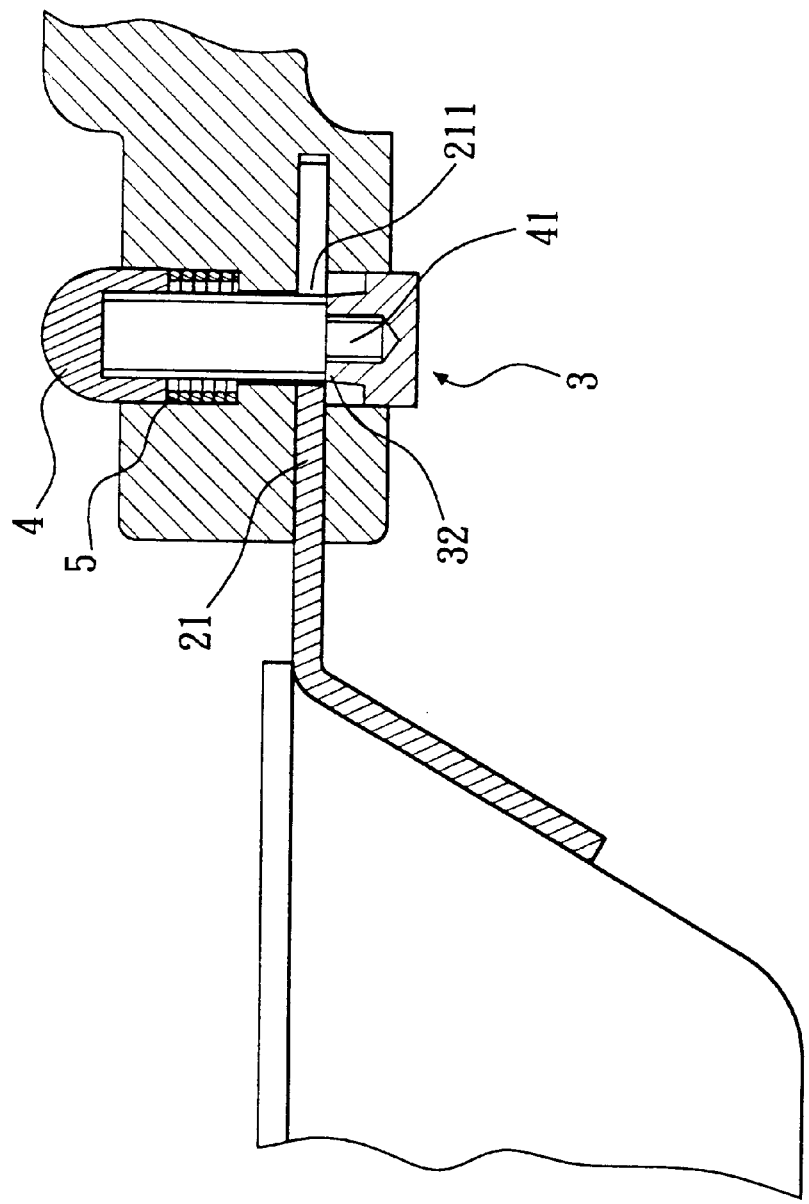
FIG. 4 is similar to FIG. 3 but showing the button pressed, the retainer element disengaged from the front coupling plate of the mounting frame.
Figure 5:
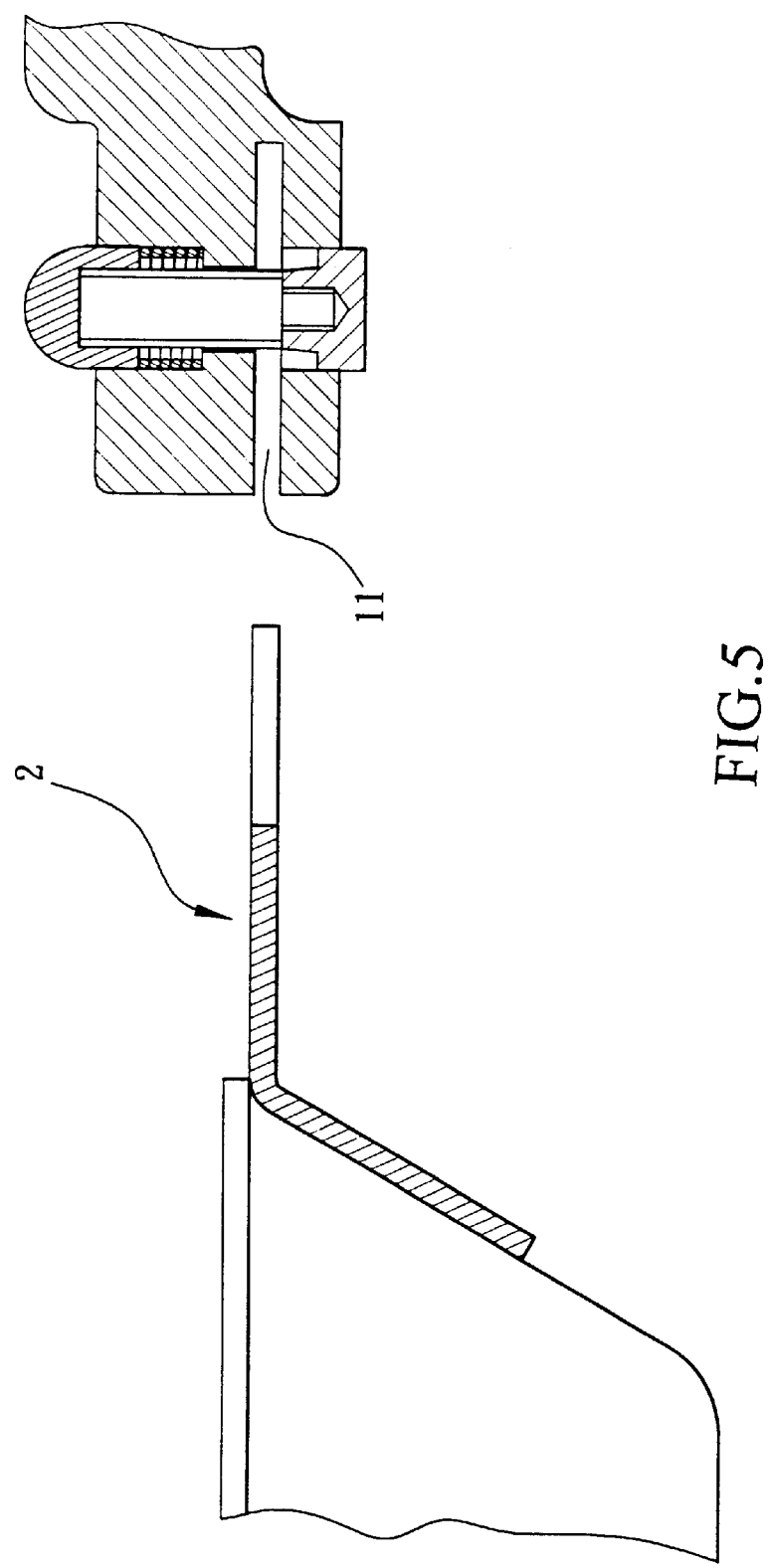
FIG. 5 shows the handle detached from the mounting frame according to the present invention.

Referring to FIGS. 4 and 5, when pressing the button 4 with the finger, the retainer element 3 is lowered with the screw rod 41 to disengage the top small diameter section 32 from the circular center hole 211 of the front plug plate 21 of the mounting frame 2. After disengagement of the retainer element 3 from the circular center hole 211 of the front plug plate 21 of the mounting frame 2, the user can easily disconnect the handle 1 from the mounting frame 2.

A prototype of detachable device handle mounting structure has been constructed with the features of FIGS. 1~5. The detachable device handle mounting structure functions smoothly to provide all of the features discussed earlier.

Although a particular embodiment of the invention has been described in detail for purposes of illustration, various modifications and enhancements may be made Without departing from the spirit and scope of the invention. Accordingly, the invention is not to be limited except as by the appended claims.

What the invention claimed is:

1. A detachable device handle mounting structure comprising:

a handle, said handle comprising a plughole axially extended through a front sidewall thereof, and a stepped through hole vertically extended through top and bottom sidewalls thereof across said plughole;

a mounting frame, said mounting frame comprising a rear mounting base adapted for fastening to an apparatus, a front plug plate plugged into the plughole of said handle, and a shoulder connected between said front plug plate and said rear mounting base and stopped against the front sidewall of said handle outside said plughole, said front plug plate having a circular center hole and a longitudinal split forwardly extended from said circular center hole to a front side thereof;

a spring member mounted in said stepped through hole of said handle and supported on a step inside said stepped through hole;

a button supported on said spring member, said button having a fixed rod member downwardly extended from a bottom side thereof and inserted through said spring member and the circular center hole of said front plug plate of said mounting frame; and a retainer element fixedly fastened to the fixed rod member of said button and adapted to lock said front plug plate in the plughole of said handle, said retainer element comprising a bottom big diameter section, a top small diameter section axially extended from said bottom big diameter section and fixedly fastened to the fixed rod member of said button and engaged into the circular center through hole of said front plug plate of said mounting frame, and a step connected between said bottom big diameter section and said top small diameter section;

wherein when pressing said button, said retainer element is lowered with said fixed rod member to disengage said top small diameter section from the circular center through hole of said front plug plate of said mounting frame, enabling said handle to be disconnected from the front plug plate of said mounting frame.

2. The detachable device handle mounting structure as claimed in claim 1, wherein said fixed rod member is a screw rod, and said top small diameter section of said retainer element has a screw hole threaded onto said screw rod.

3. The detachable device handle mounting structure as claimed in claim 1, wherein said top small diameter section of said retainer element is tapered, having an outer diameter gradually reduced in direction from the step of said retainer element toward the topmost edge thereof.

* * * * *